(12) United States Patent
Fales

(10) Patent No.: US 9,778,012 B1
(45) Date of Patent: Oct. 3, 2017

(54) PIPE CONTOUR GAUGE

(71) Applicant: John Fales, McLouth, KS (US)

(72) Inventor: John Fales, McLouth, KS (US)

( * ) Notice: Subject to any disclaimer, the term of this patent is extended or adjusted under 35 U.S.C. 154(b) by 79 days.

(21) Appl. No.: 15/012,950

(22) Filed: Feb. 2, 2016

(51) Int. Cl.
*G01B 5/20* (2006.01)
*G01B 5/207* (2006.01)

(52) U.S. Cl.
CPC .................................... *G01B 5/207* (2013.01)

(58) Field of Classification Search
CPC ...... G01B 5/008; G01B 3/1071; G01B 3/563; G01B 5/207
USPC ............................................................. 33/529
See application file for complete search history.

(56) References Cited

U.S. PATENT DOCUMENTS

| | | | |
|---|---|---|---|
| 250,638 A | 12/1881 | Baekee | |
| 496,657 A | 5/1893 | Vause | |
| 1,665,721 A | 4/1928 | Stockton | |
| 2,615,256 A | 10/1952 | Olson | |
| 4,444,204 A * | 4/1984 | Bryant | A61B 5/1077 33/512 |
| 4,677,751 A * | 7/1987 | Masseth | G01B 3/20 33/199 R |
| 4,807,369 A * | 2/1989 | Ming-Chin | G01B 5/207 33/21.3 |
| 4,928,392 A | 5/1990 | Donaldson | |
| 5,014,441 A | 5/1991 | Pratt | |
| 5,546,668 A * | 8/1996 | Ahdoot | G01B 5/207 33/514.2 |
| 6,209,215 B1 * | 4/2001 | Helms | G01B 5/207 33/529 |
| 6,601,312 B1 * | 8/2003 | Phuly | B23K 9/0286 33/412 |
| 6,854,190 B1 * | 2/2005 | Lohmann | B25H 7/005 33/1 SB |
| 6,904,690 B2 * | 6/2005 | Bakke | G01B 3/42 33/1 H |
| 7,134,218 B1 * | 11/2006 | Mitchell | G01B 3/14 33/1 SB |
| 7,350,311 B2 * | 4/2008 | Marks | B43L 13/20 33/1 B |
| 7,685,734 B1 * | 3/2010 | Burger | B25H 7/005 33/1 G |
| D671,018 S | 11/2012 | Maste | |
| 8,307,895 B2 | 11/2012 | Lund | |
| 2010/0058855 A1 * | 3/2010 | Tadin | A61B 5/1036 33/515 |

(Continued)

FOREIGN PATENT DOCUMENTS

WO 0008413 A1 2/2000

*Primary Examiner* — Yaritza Guadalupe-McCall

(57) ABSTRACT

The pipe contour gauge is a device used to determine a diameter of a pipe or other object. The pipe contour gauge is constructed of a contour base from which a plurality of tines is able to move. Each of the plurality of tines is generally parallel with adjacent ones of the plurality of tines. Moreover, each of the plurality of tines is able to move independent of any remaining ones of the plurality of tines. Each of the plurality of tines is able to move up or down with respect to the contour base. The plurality of tines is adapted to interface with a surface of an object in order to form a profile that is compared with a chart outlining different diameters. The chart that outlines different diameters is used to decipher a size of a pipe or cylindrically-shaped object.

4 Claims, 6 Drawing Sheets

(56) References Cited

U.S. PATENT DOCUMENTS

| | | | | |
|---|---|---|---|---|
| 2010/0212197 A1* | 8/2010 | Kleyman | ............... | F02F 1/16 |
| | | | | 33/561.1 |
| 2012/0266472 A1* | 10/2012 | Liza | ................ | E04F 21/0076 |
| | | | | 33/527 |
| 2013/0212892 A1* | 8/2013 | Saravanos | ........... | E04F 21/0076 |
| | | | | 33/527 |
| 2014/0047725 A1* | 2/2014 | Taylor | ................ | B43L 13/20 |
| | | | | 33/529 |
| 2014/0360033 A1* | 12/2014 | Miller | ................ | A43D 1/02 |
| | | | | 33/515 |
| 2016/0002935 A1* | 1/2016 | Saravanos | ........... | E04F 21/0076 |
| | | | | 33/527 |

* cited by examiner

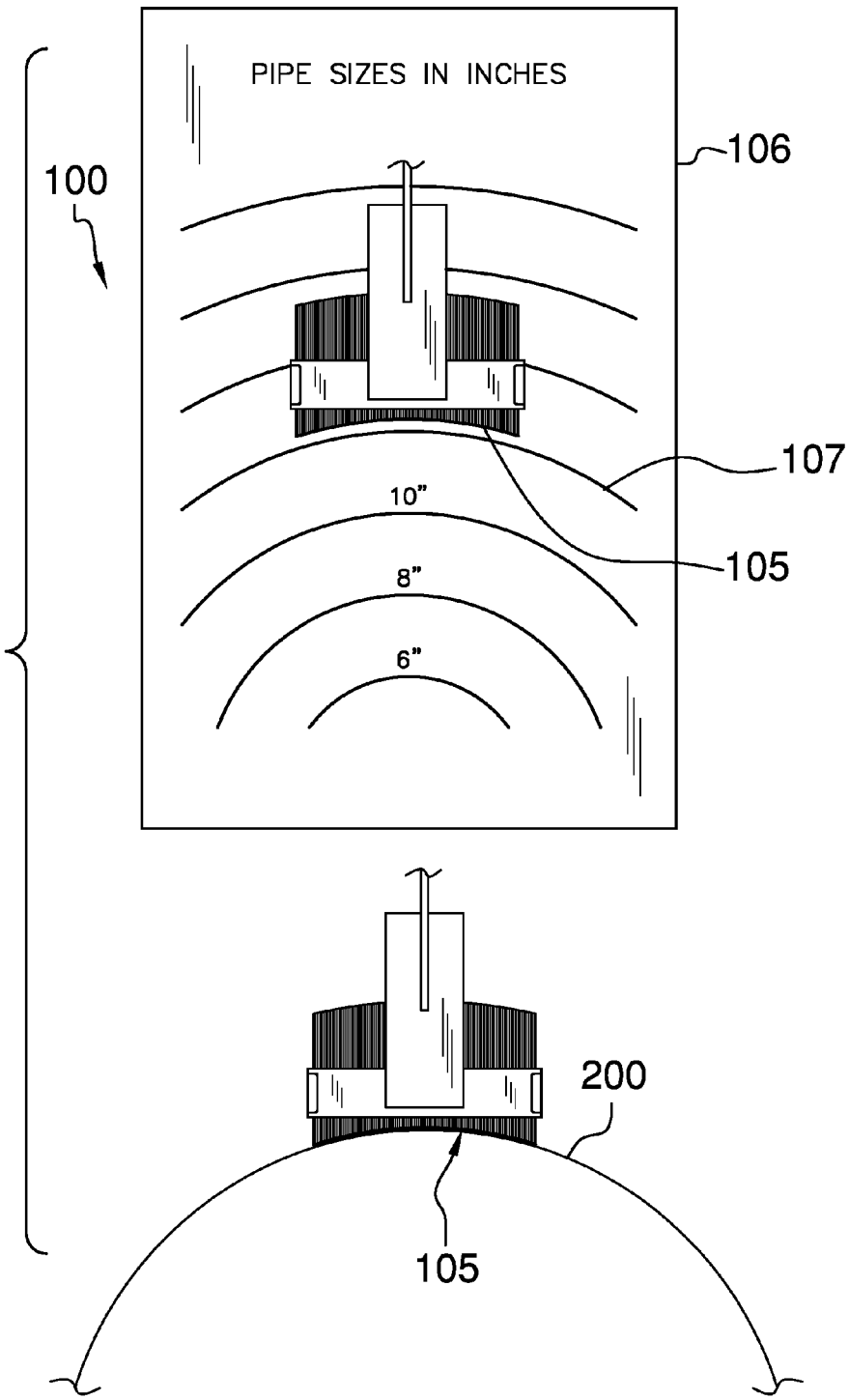

US 9,778,012 B1

PIPE CONTOUR GAUGE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools and construction, more specifically, a tool that is used to determine the contour of a pipe in order to determine the gauge of said pipe.

SUMMARY OF INVENTION

The pipe contour gauge is a device used to determine a diameter of a pipe or other object. The pipe contour gauge is constructed of a contour base from which a plurality of tines is able to move. Each of the plurality of tines is generally parallel with adjacent ones of the plurality of tines. Moreover, each of the plurality of tines is able to move independent of any remaining ones of the plurality of tines. Each of the plurality of tines is able to move up or down with respect to the contour base. The plurality of tines is adapted to interface with a surface of an object in order to form a profile that is compared with a chart outlining different diameters. The chart that outlines different diameters is used to decipher a size of a pipe or cylindrically-shaped object.

These together with additional objects, features and advantages of the pipe contour gauge will be readily apparent to those of ordinary skill in the art upon reading the following detailed description of the presently preferred, but nonetheless illustrative, embodiments when taken in conjunction with the accompanying drawings.

In this respect, before explaining the current embodiments of the pipe contour gauge in detail, it is to be understood that the pipe contour gauge is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pipe contour gauge.

It is therefore important that the claims be regarded as including such equivalent construction insofar as they do not depart from the spirit and scope of the pipe contour gauge. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a view of an embodiment of the disclosure in use with a chart.

DETAILED DESCRIPTION OF THE EMBODIMENT

Figure 1:
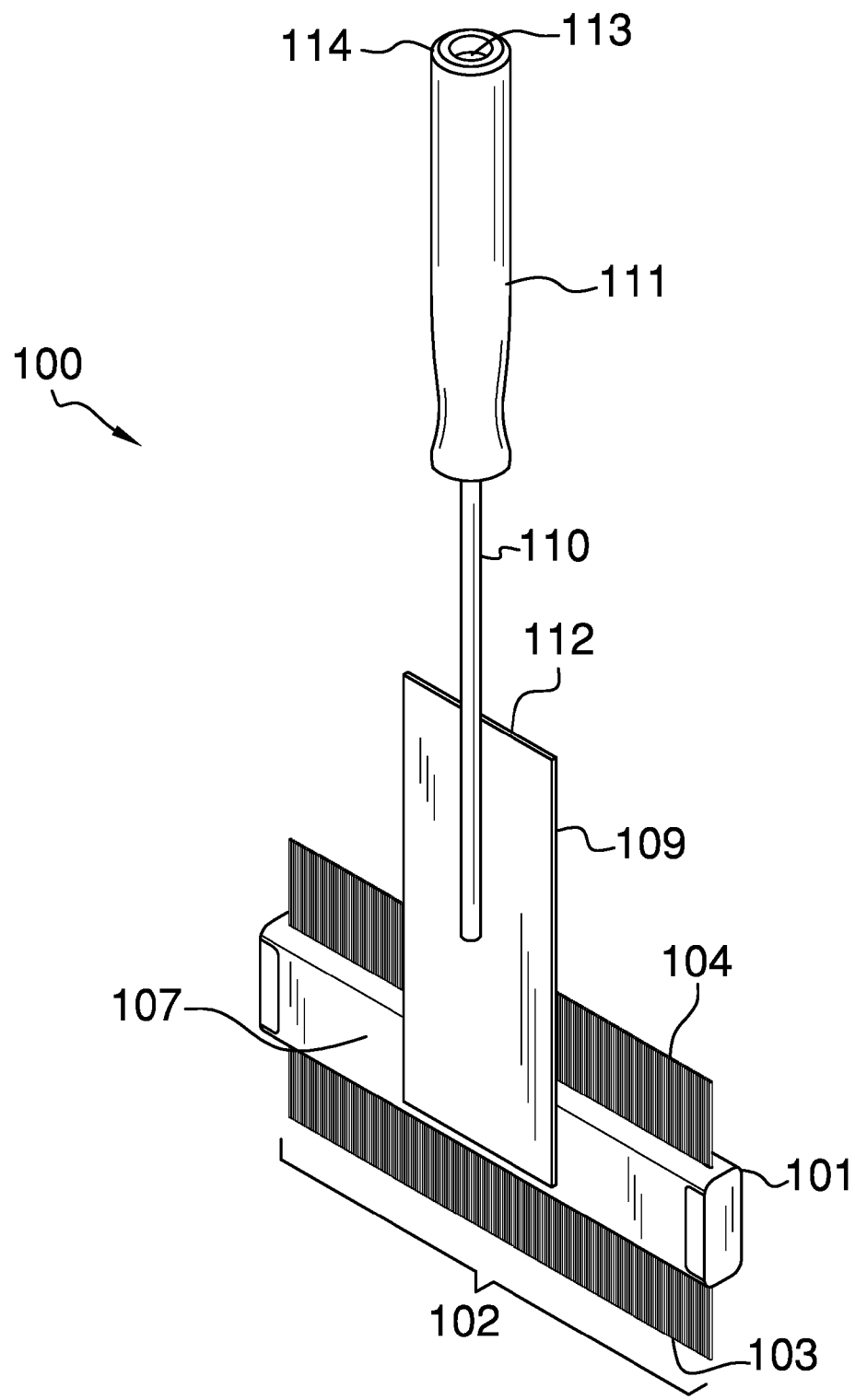
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6.

The pipe contour gauge 100 (hereinafter invention) comprises a contour base 101 from which a plurality of tines 102 is able to move. The contour base 101 is perpendicularly-oriented with respect to the plurality of tines 102. The plurality of tines 102 is further defined as a plurality of needle-shaped objects that are generally parallel with one another. Moreover, each of the plurality of tines 102 is linearly aligned with respect to the contour base 101.

The plurality of tines 102 are each further defined with a first tine end 103 and a second tine end 104. The first tine end 103 is adapted to interface with a surface 200. The plurality of tines 102 are able to move up or down with respect to the contour base 101 in order to form a profile 105. The profile 105 is further defined as a connection of points formed along all of the first tine ends 103 of the plurality of tines 102.

Figure 4:
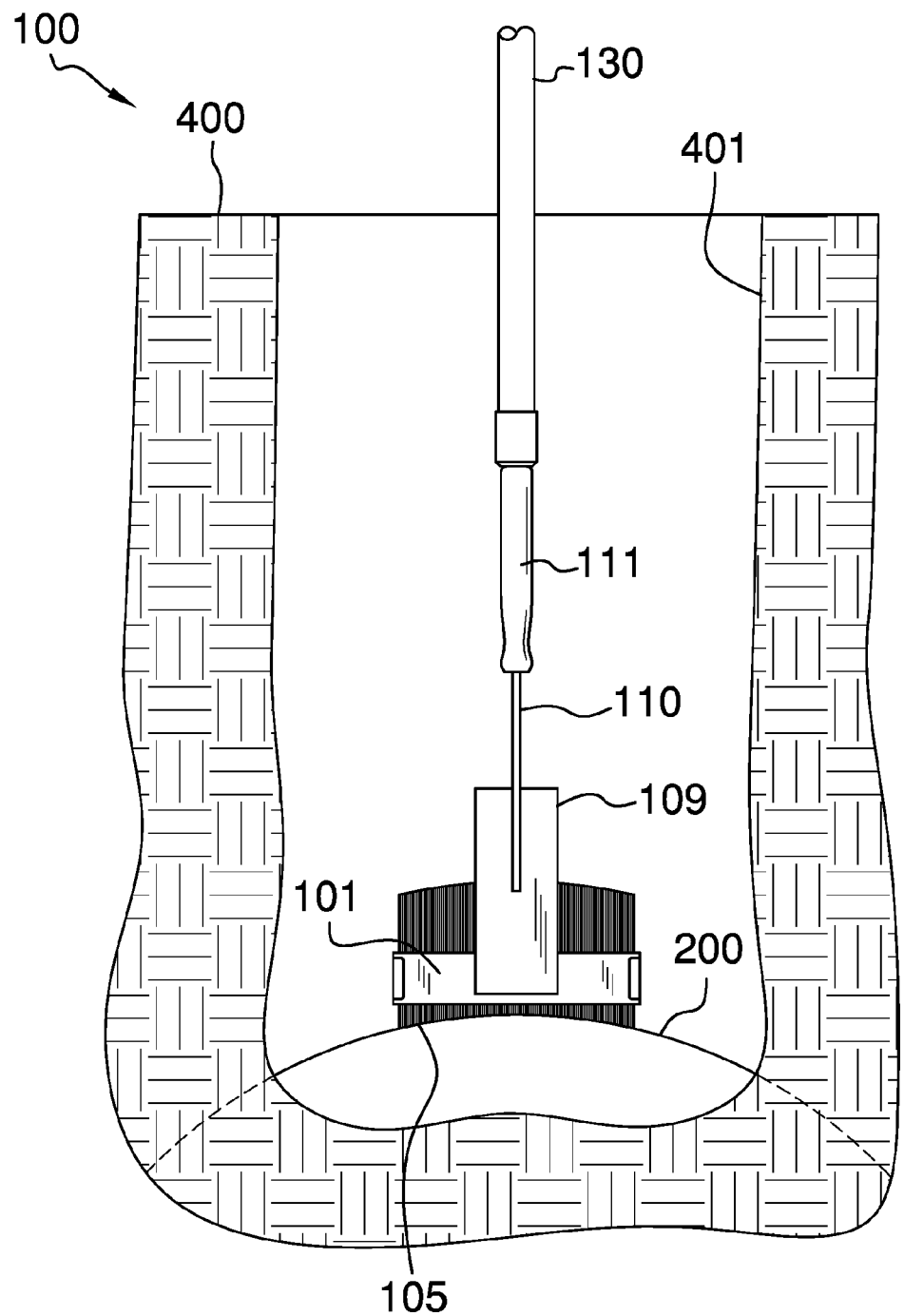
FIG. 4 is a front view of an embodiment of the disclosure in use.
Figure 5:
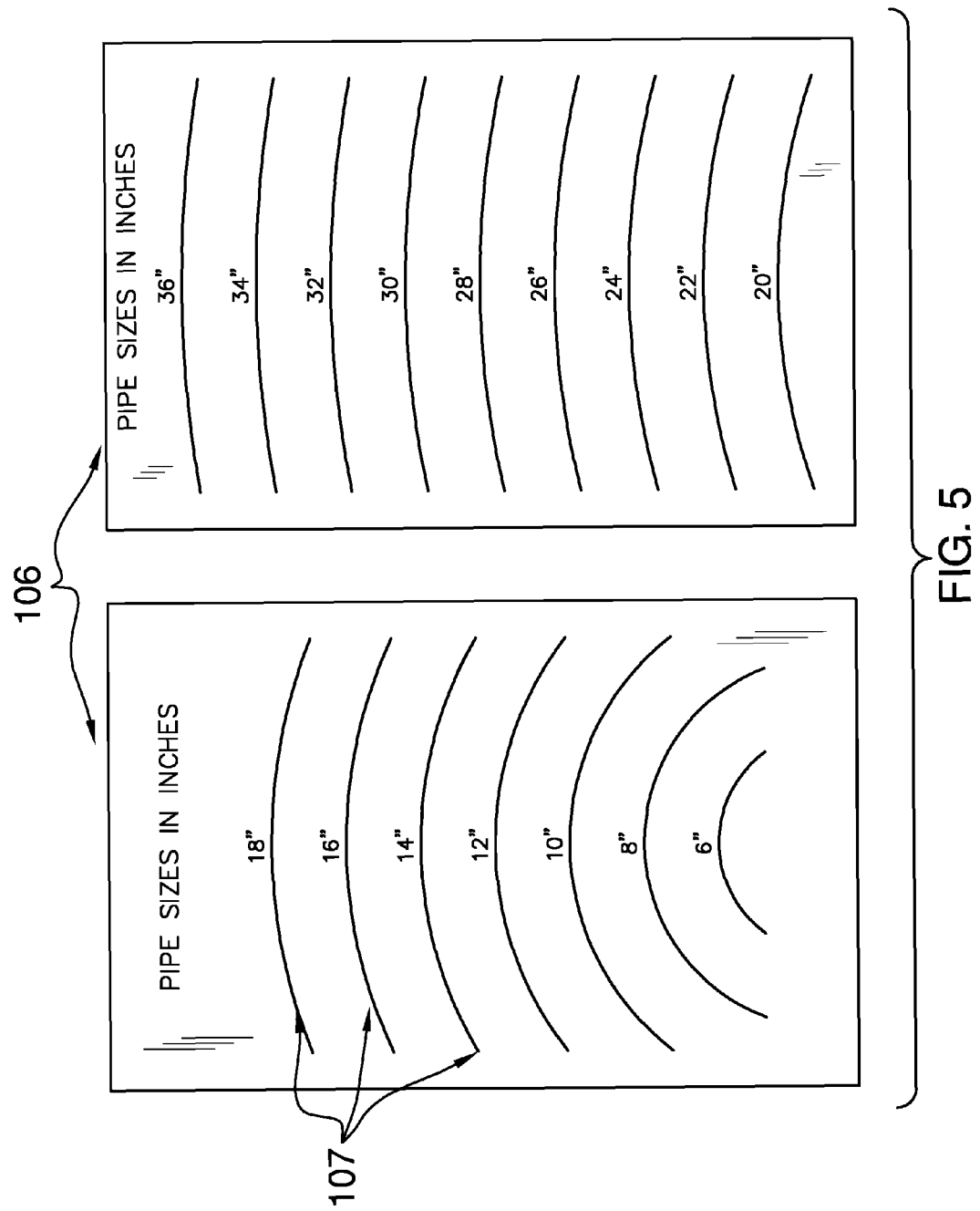
FIG. 5 is a view of charts that are used in concert with an embodiment of the disclosure.

The invention 100 includes at least one chart 106 that displays a plurality of gauge representations 107 thereon. The plurality of gauge representations 107 are for illustrative purposes used to decipher a diameter of the surface 200. Ideally, the invention 100 is used to decipher the gauge of the surface 200, which may be a pipe that is partially or wholly buried underneath a ground surface 400. The profile 105 created via the plurality of tines 102 is compared to the plurality of gauge representations 107 of the at least one chart 106 in order to decipher the gauge of the surface 200. Referring to FIG. 4, the surface 200 is partially visible via a hole 401 dug into the ground surface 400, and the invention 100 is adapted to contact the surface 200 via a pole 130.

The contour base 101 is further defined with a rear surface 107 that is opposite of a front surface 108. The rear surface 107 is rigidly affixed to a planar member 109. The planar member 109 extends upwardly from the rear surface 107. Moreover, the planar member 109 is generally parallel with the plurality of tines 102. The planar member 109 extends beyond the second tine end 104 of the plurality of tines 102. The planar member 109 is attached to a first bar 110. The first bar 110 extends upwardly. The first bar 110 is attached to a handle 111 at a second bar end 112. The handle 111 is optionally attached to the pole 130. Moreover, the handle 111 includes a threaded hole 113 at a third end 114.

Figure 2:
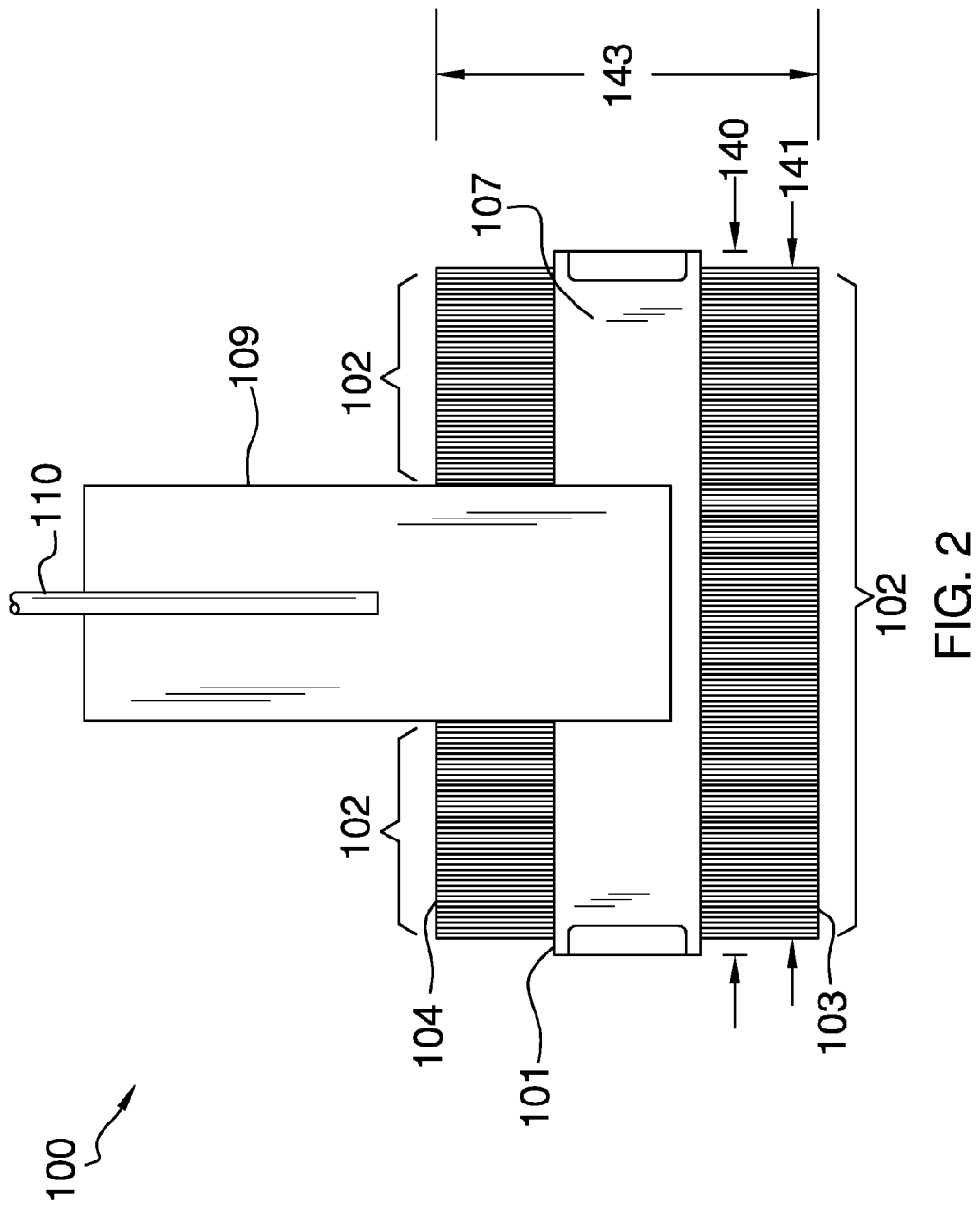
FIG. 2 is a front view of an embodiment of the disclosure.
Figure 3:
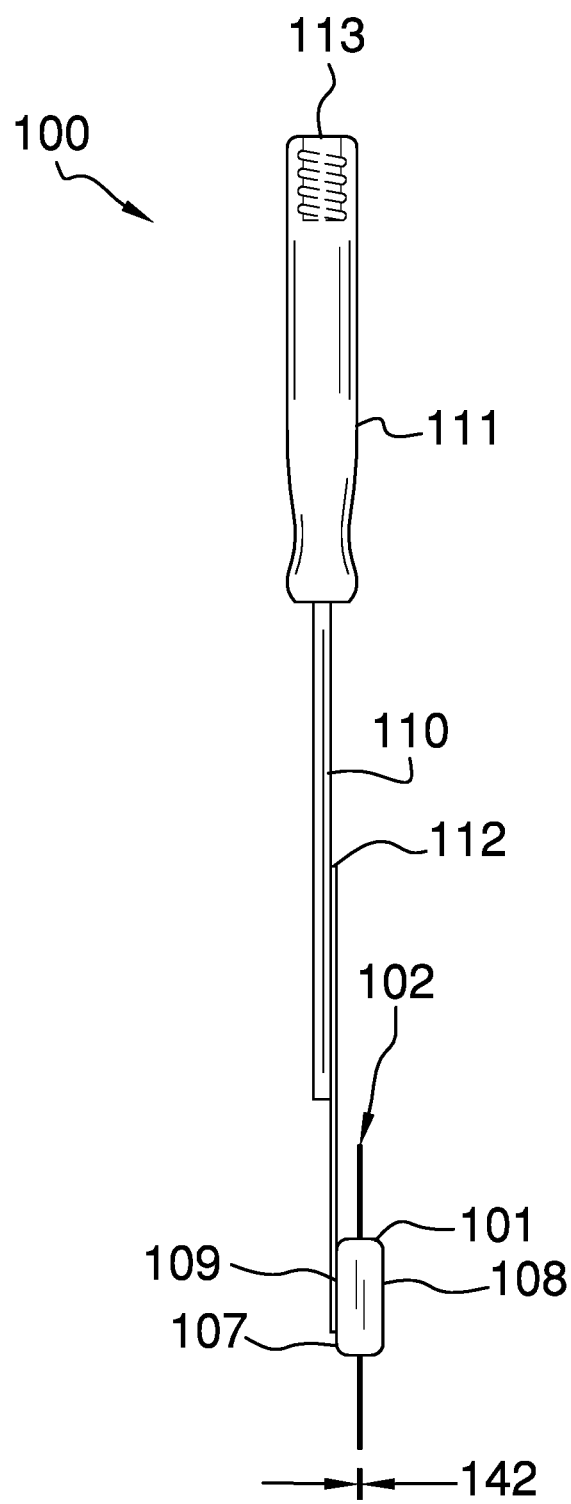
FIG. 3 is a side view of an embodiment of the disclosure.

Referring to FIG. 2, the contour base 101 has a contour length 140. The plurality of tines 102 forms a tine length 141. The tine length 141 is less than the contour length 140. It shall be noted that the contour length 140 may be not less than 6 inches. Obviously, the greater the tine length 141 the more exact the profile 105 generated via the surface 200. Referring to FIG. 3, the plurality of tines 102 have a tine thickness 142. The tine thickness 142 may be no greater than 0.125 inches. The contour base 101 and the plurality of tines 102 generate a thin overall profile, which improves ease of use of the invention 100 with respect to the hole 401 dug into the ground surface 400. Also, the plurality of tines 102 may be further characterized with a tine height 143. The tine height 143 shall be not less than 4 inches. The greater the tine height 143, the greater movement of the plurality of tines 102 with respect to the contour base 101.

The contour base 101, the plurality of tines 102, the planar member 109, the bar member 110, and the handle 111 may be constructed of a material comprising a metal, plastic, wood, or carbon fiber composite.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A pipe contour gauge comprising:
a plurality of tines able to move up or down with respect to a contour base;
wherein the plurality of tines are adapted to engage a surface in order to generate a profile that is used to adaptively decipher a gauge of said surface;
wherein the contour base is perpendicularly-oriented with respect to the plurality of tines;
wherein the plurality of tines is further defined as a plurality of needle-shaped objects that are generally parallel with one another;
wherein each of the plurality of tines is linearly aligned with respect to the contour base;
wherein the plurality of tines are each further defined with a first tine end and a second tine end
wherein the first tine end is adapted to interface with the surface in order to generate said profile;
wherein the plurality of tines are able to move up or down with respect to the contour base in order to form the profile;
wherein the profile is further defined as a connection of points formed along all of the first tine ends of the plurality of tines;
wherein at least one chart is included with the pipe contour gauge;
wherein the at least one chart displays a plurality of gauge representations thereon;
wherein the plurality of gauge representations are used to compare with the profile in order to adaptively decipher the gauge of said surface;
wherein the plurality of tines and the contour base are adapted to engage the surface where the surface is optionally positioned underneath a ground surface wherein a hole being dug into the ground surface is adapted to provide access to the surface in order for the plurality of tines to adaptively interface with the surface in order to adaptively decipher the gauge of said surface;
wherein the contour base is further defined with a rear surface that is opposite of a front surface;
wherein the rear surface is rigidly affixed to a planar member;
wherein the planar member extends upwardly from the rear surface;
wherein the planar member is generally parallel with the plurality of tines; wherein the planar member extends beyond the second tine end of the plurality of tines;
wherein the planar member is attached to a first bar; wherein the first bar extends upwardly;
wherein the first bar is attached to a handle at a second bar end;
wherein the handle is optionally affixed to a pole so as to enable the plurality of tines and the contour base to adaptively descend into said hole dug into said ground surface in order to adaptively engage said plurality of tines with respect to the surface;
wherein the handle includes a threaded hole at a third end;
wherein the threaded hole is optionally attached to said pole.

2. The pipe contour gauge according to claim 1 wherein the contour base has a contour length; wherein the plurality of tines forms a tine length; wherein the tine length is less than the contour length; wherein the contour length may be not less than 6 inches.

3. The pipe contour gauge according to claim 2 wherein the plurality of tines have a tine thickness.

4. The pipe contour gauge according to claim 3 wherein the plurality of tines is further characterized with a tine height.

* * * * *